United States Patent Office 3,390,189
Patented June 25, 1968

3,390,189
PROCESS FOR PREPARING PENTAORGANO-
TRIPHOSPHINES
Max van Ghemen and Egon Wiberg, Munich, Germany, assignors to Hooker Chemical Corporation, Niagara Falls, N.Y., a corporation of New York
No Drawing. Filed May 22, 1963, Ser. No. 282,220
8 Claims. (Cl. 260—606.5)

The present invention relates to organophosphorus compounds and to the preparation of the same. More particularly, the invention is concerned with organophosphorus compounds containing three phosphorus atoms and to processes for preparing them.

There have been numerous successful attempts to synthesize phosphine derivatives and diphosphines of the formula:

$$R_2P\text{—}PR_2$$

However, only a very little is known about the synthesis of polyphosphines. Triphosphines ($P_3H_5$) have recently been formed by a spectroscopic method as degradation products of diphosphines (Naturwissenschaften 46, 578 (1959)).

In accordance with the present invention, organophosphorus compounds containing three phosphorus atoms, are prepared by the reaction of halophosphines with alkali metal phosphines or arylphosphines. The reactions occurring can best be illustrated by the following typical equations:

(1)
$$R'_nA_1PX_2 + 2[(R''_yA_2)(R'''_zA_3)PM] \longrightarrow$$
$$2MX + (R''_yA_2)R'''_zA_3\,P\,P\,P\,(R''_yA_2)R'''_zA_3$$
$$\underset{R'_nA_1}{|}$$

wherein the substituents:
(a) R', R" and R''' are each selected from the group consisting of alkyl and alkoxy;
(b) n, y and z represent the number of R', R" and R''' substituents attached to the core structures $A_1$, $A_2$ and $A_3$; said n, y and z being preferably zero when $A_1$, $A_2$ and $A_3$ are alkyl and, said n, y, and z being zero to one when $A_1$, $A_2$, and $A_3$ are aryl;
(c) $A_1$, $A_2$ and $A_3$ are radicals selected from the group consisting of alkyl, preferably of one to six carbon atoms, and aryl (Ar), said Ar substituent being an organic radical derived from an aromatic hydrocarbon by the removal of one hydrogen atom;
(d) X is a halogen atom selected from the group consisting of chlorine, bromine and iodine;
(e) M is an alkali metal.

It is to be noted that in the above equation the R', R", R''', as well as the $A_1$, $A_2$, $A_3$ substituents may be the same or different as will be more clearly illustrated herein. Also the number of substituents present, as represented by the symbols n, y and z may be the same or different as will also be illustrated.

(2)
$$R'_nA_1PX_2 + 2[(R''_yA_2)(R'''_zA_3)PH] \xrightarrow{\text{solvent}}$$
$$2HX + (R''_yA_2)(R'''_zA_3)P\,P\,P\,(R''_yA_2)R'''_zA_3$$
$$\underset{R'_nA_1}{|}$$

wherein the substituents:
(a) $A_1$, $A_2$ and $A_3$ are aryl, aryl being defined as in Equation 1 (c) above;
(b) X is a halogen atom selected from the group consisting of bromine and iodine; and
(c) the remaining substituents are as defined in Equation 1 above. In the equation above, the term "solvent" represents those compounds which will complex the HX, such as alkylamines.

(3)
$$R'_nA_1PX_2 + 2[(R''_yA_2)(R'''_zA_3)PH] \longrightarrow$$
$$(R''_yA_2)(R'''_zA_3)P\,P\,P\,(R''_yA_2)R'''_zA_3 \cdot 2HX$$
$$\underset{R'_nA_1}{|}$$

wherein all the substituents are as defined in Equation 2 above.

Illustrative examples of the R', R" and R''' substituents included within the present invention are:
(a) alkyl usually of one to eighteen, preferably of one to six carbon atoms, such as methyl, ethyl, propyl, butyl, octyl, stearyl, and the like;
(b) alkoxy, preferably of one to six carbon atoms, such as methoxy, ethoxy, propoxy, butoxy, ethoxyethoxy, and the like;

It is to be appreciated that the R', R" and R''' substituents may be any such radical, which, under the conditions of the reaction herein, is inert and does not affect the reaction mechanism.

The letters n, y, and z represent the number of R', R" and R''' substituents attached to the core structures $A_1$, $A_2$ and $A_3$ and depend on the number of $A_1$, $A_2$ and $A_3$ radicals present. The number of R' R", R''' substituents n, y and z attached to the core structures $A_1$, $A_2$, $A_3$ are preferably of from zero to about one. The n, y and z substituents, as well as their values, may be the same or different as will be more clearly shown herein.

Illustrative examples of the $A_1$, $A_2$ and $A_3$ substituents include:
(a) alkyl of preferably one to six carbon atoms, such as methyl, ethyl, propyl, butyl, stearyl, and the like; and
(b) aryl of preferably six to eighteen carbon atoms, such as phenyl, tolyl, salicyl and the like.

The substituent M is a metal and is preferably selected from the group consisting of alkali metals, such as sodium, potassium or lithium, and the like.

The reaction temperature employed in accomplishing the process of the invention is usually below zero degrees centigrade. Temperatures as low as the temperature of liquid nitrogen, about −190 degrees, and temperatures as high as about 80 degrees centigrade have been used. However, other temperatures can be employed which will not adversely affect the reaction.

Pressure is conveniently well below atmospheric, however, other pressures may be utilized which will not adversely affect the reaction mechanism.

The mole ratio of reagents is preferably one mole of halophosphine to two moles of alkali metal phosphine or two moles arylphosphine. Molar ratios which do not adversely affect the reaction mechanism can be employed without departing from the invention.

The products of the invention are generally isolated by filtration and purified by recrystallization, although other methods of separation and purification can be used.

The following equations will further illustrate the invention. They are not intended to be limiting:

(1)
$$C_6H_5PCl_2 + 2(C_6H_5)_2PM \xrightarrow{-20°C.} 2MCl + (C_6H_5)_2P\underset{\underset{C_6H_5}{|}}{P}P(C_6H_5)_2$$

In this equation, the substituents $A_1$, $A_2$ and $A_3$ are all phenyl, while the substituents $n$, $z$ and $y$ have a value of zero.

(2)
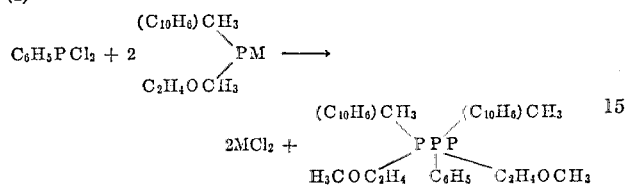

In the above equation, $A_1$ is phenyl, $A_2$ is naphthyl, $A_3$ is ethyl, $n$ is equal to zero, $y$ is equal to one, and $z$ is equal to one, $R''$ is methyl and $R'''$ is methoxy.

(3)
$$C_2H_5PCl_2 + 2(C_2H_5)_2PM \longrightarrow 2MCl + (C_2H_5)_2P\underset{\underset{C_2H_5}{|}}{P}P(C_2H_5)_2$$

wherein $A_1$, $A_2$ and $A_3$ are each ethyl, $n$, $y$ and $z$ are each zero.

More specific non-limiting equations follow:

(1)
(a)
$$C_6H_5PCl_2 + 2(C_6H_5)_2PNa \xrightarrow{-20°C.} 2NaCl + (C_6H_5)_2P\,P\,C_6H_5P(C_6H_5)_2$$

(b)
$$C_2H_5PCl_2 + 2(C_2H_5)_2PLi \xrightarrow{-40°C.} 2LiCl + (C_2H_5)_2P\,P\,C_2H_5P(C_2H_5)_2$$

(2)
$$C_6H_5PBr_2 + 2(C_6H_5)_2PH \xrightarrow[-30°C.]{N(C_2H_5)_3} 2HBr + P_3(C_6H_5)_5$$

(3)
$$C_6H_5PBr_2 + 2(C_6H_5)_2PH \xrightarrow{-10°C.} (C_6H_5)_5P_3\cdot 2HBr$$

The compounds of this invention are useful as antioxidants in gasoline. Further, the compounds may also be incorporated in small amounts in motor fuels, such as gasoline, which contain tetraethyl lead to suppress pre-ignition firing. They are also useful as lubricant additives to motor oils.

The following illustrative examples will serve to more fully describe the invention. Unless otherwise noted, the parts given are by weight and the temperatures are in degrees centigrade.

Example 1

$$C_6H_5PCl_2 + 2(C_6H_5)_2PNa \xrightarrow{(C_2H_5)_2O} 2NaCl + P_3(C_6H_5)_5$$

A solution of 1.50 ml. of phenyldichlorophosphine ($C_6H_5PCl_2$) in 50 ml. of ether was added drop-wise under a nitrogen atmosphere at $-20$ degrees centigrade to a suspension of 55.8 millimoles of sodium diphenylphosphine ($(C_6H_5)_2PNa$) in ether. The mixture was warmed up to room temperature and the resulting solution was then filtered to remove the excess $(C_6H_5)_2PNa$ and sodium chloride. The filtrate was evaporated and the residue was recrystallized from chloroform to yield colorless crystals of pentaphenyltriphosphine $P_3(C_6H_5)_5$.

*Analysis.*—Calculated: P, 19.42 percent, molecular weight 478.5. Found: P, 19.76 percent, molecular weight 482.0.

In a similar manner, the reaction can be accomplished in other solvents which will be of assistance in causing the desired product to form, such as benzene.

Example 2

$$C_6H_5PBr_2 + (C_6H_5)_2PH \xrightarrow{(C_2H_5)_3N} (C_6H_5)_5P_3$$

4.3091 grams of phenyldibromophosphine ($C_6H_5PBr_2$) were dissolved in 20 ml. of ether. The mixture was cooled under liquid nitrogen and a solution of 5.57 millimoles of diphenylphosphine in 15 ml. of ether, together with a solution of 4.42 millimoles of triethylamine in 15 ml. of ether, were condensed in a vacuum into the $C_6H_5PBr_2$ solution. The resultant reaction mixture was then gradually heated up to $-30$ degrees centigrade and then up to room temperature, about 25 degrees centigrade. Following filtration and evaporation, a yellowish material is obtained which is recrystallized from petroleum ether to yield pentaphenyltriphosphine $P_3(C_6H_5)_5$. The compound $P_3(C_6H_5)_5$ reduced concentrated $H_2SO_4$ to $SO_2$. Contact of $P_3(C_6H_5)_5$ with $HNO_3$ resulted in an explosive decomposition. The $P_3(C_6H_5)_5$ was found to be soluble in benzene, chloroform, ether and tetrahydrofuran.

*Analysis.*—Calculated for $P_3(C_6H_5)_5$: P, 19.42 percent, molecular weight 478.5. Found: P, 18.86 percent, molecular weight 481.7.

Example 3

$$C_6H_5PBr_2 + 2(C_6H_5)_2PH \rightarrow (C_6H_5)_5P_3\cdot 2HBr$$

A solution of 3.98 ml. (22.9 moles) of diphenylphosphine ($Ph_2PH$) in 50 ml. ether was condensed under a vacuum with a deep-frozen solution of 3.0705 grams (11.45 millimoles) phenyldibromophosphine ($PhPBr_2$) in 50 ml. diethyl ether. A colorless precipitate formed when the reaction mixture was gradually warmed to $-10$ degrees centigrade. Hydrogen bromide (HBr) evolution did not occur. The entire amount of bromine remained in the yellowish pot residue, which was obtained after evaporating off the ether.

*Analysis.*—Calculated for $P_3Ph_5\cdot 2HBr$: Br, 24.96 percent; P, 14.5 percent. Found: Br, 24.19 percent; P, 14.73 percent.

Example 4

$$C_6H_5PCl_2 + 2(C_6H_5)_2PNa \rightarrow P_3(C_6H_5)_5 + 2NaCl$$

In a similar manner to that described in Example 1, sodium diphenylphosphine was reacted with phenyldichlorophosphine, employing tetrahydrofuran as a solvent. The product pentaphenyltriphosphine $P_3(C_6H_5)_5$ was obtained in good yield as identified by infrared analysis.

Example 5

$$C_2H_5PCl_2 + 2(C_2H_5)_2PLi \rightarrow P_3(C_2H_5)_5 + 2LiCl$$

35 ml. of a 2 N butyl lithium solution in ether (70 millimoles) were added drop-wise at room temperature and under a nitrogen atmosphere to a solution of 6.3 grams (70 millimoles) of diethyl phosphine in 20 ml. ether. The formation of diethyl lithium phosphine proceeded at reflux temperature, accompanied by evolution of butane. Then, the solution was cooled to $-40$ degrees centigrade and 4.10 grams (31.3 millimoles) ethyldichlorophosphine, $C_2H_5PCl_2$, were drop-wise added to the thoroughly stirred $C_2H_5PLi$ solution. An orange colored precipitate formed. The ether was then evaporated at $-10$ degrees centigrade by employing a vacuum. The residue is distilled in high vacuum at 95 degrees centigrade to yield 1.148 grams of a pure $P_3(C_2H_5)_5$.

*Analysis.*—Calculated for $P_3(C_2H_5)_5$: P, 39.04 percent; C, 50.50 percent; H, 10.50 percent. Found: P, 40.08 percent; C, 50.80 percent; H, 10.65 percent.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized

We claim:
1. A process for the preparation of the compounds of the formula

$$(R''_yA_2)(R'''_zA_3)PPP(R''_yA_2)R'''_zA_3$$
$$|$$
$$R'_nA_1$$

comprising contacting a compound of the formula:

$$R'_nA_1PX_2$$

with a compound of the formula:

$$(R''_yA_2)R'''_zA_3PM$$

in about a one to two molar ratio, at a temperature from 0° C. to −190° C., wherein the substituents:
  (a) R', R'' and R''' are each selected from the group consisting of alkyl and alkoxy;
  (b) n, y and z are zero to one and represent the number of R', R'' and R''' substituents attached to the core structures $A_1$, $A_2$ and $A_3$, said n, y and z being zero when $A_1$, $A_2$ and $A_3$ are alkyl;
  (c) $A_1$, $A_2$ and $A_3$ are radicals selected from the group consisting of alkyl and aryl;
  (d) X is a halogen atom selected from the group consisting of chlorine, bromine and iodine; and
  (e) M is an alkali metal.

2. A process in accordance with claim 1 wherein X is chlorine, $A_1$, $A_2$, and $A_3$ are selected from the group consisting of phenyl and alkyl of from 1 to 6 carbon atoms, and n, y and z are each zero.

3. A process in accordance with claim 2 wherein the process is conducted under vacuum and in a solvent for the reaction.

4. A process in accordance with claim 3 wherein M is the metal sodium.

5. A process for the preparation of pentaphenyltriphosphine, according to claim 4, comprising contacting sodium diphenylphosphine with phenyldichlorophosphine.

6. A process for the preparation of the compounds of the formula $$(R''_yA_2)(R'''_zA_3)PPP(R''_yA_2)R'''_zA_3$$
$$|$$
$$R'_nA_1$$

comprising contacting a compound of the formula:

$$R'_nA_1PX_2$$

with a compound of the formula:

$$(R''_yA_2)(R'''_zA_3)PH$$

in about a one to two molar ratio, at a temperature from 0° C. to −190° C., wherein the substituents:
  (a) $A_1$, $A_2$ and $A_3$ are aryl;
  (b) X is a halogen atom selected from the group consisting of bromine and iodine;
  (c) R', R'' and R''' are each selected from the group consisting of alkyl and alkoxy;
  (d) n, y and z are zero or one and represent the number of R', R'' and R''' substituents attached to the core structures $A_1$, $A_2$ and $A_3$.

7. A process in accordance with claim 6 wherein $A_1$, $A_2$ and $A_3$ are phenyl; n, y and z are each zero and the reaction is conducted under vacuum and in a solvent for the reaction.

8. A process for the preparation of pentaphenyltriphosphine, according to claim 7, comprising contacting phenyldibromophosphine with diphenylphosphine.

References Cited
UNITED STATES PATENTS 3,242,216   3/1966   LudwigMaier _____ 260—606.5

TOBIAS E. LEVOW, *Primary Examiner.*

HELEN M. McCARTHY, *Examiner.*

W. F. W. BELLAMY, *Assistant Examiner.*